(12) United States Patent  
Lin

(10) Patent No.: US 9,653,966 B2  
(45) Date of Patent: May 16, 2017

(54) COOLANT SUPPLYING AND COLLECTING APPARATUS AND MOTOR INCLUDING THE SAME

(71) Applicant: LG INNOTEK CO., LTD., Seoul (KR)

(72) Inventor: Song Lin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 698 days.

(21) Appl. No.: 14/105,856

(22) Filed: Dec. 13, 2013

(65) Prior Publication Data

US 2014/0167537 A1    Jun. 19, 2014

(30) Foreign Application Priority Data

Dec. 17, 2012  (KR) .................. 10-2012-0147375

(51) Int. Cl.

| | | |
|---|---|---|
| *H02K 1/32* | (2006.01) | |
| *H02K 9/00* | (2006.01) | |
| *H02K 9/19* | (2006.01) | |
| *H02K 9/193* | (2006.01) | |

(52) U.S. Cl.  
CPC ............... *H02K 9/00* (2013.01); *H02K 1/32* (2013.01); *H02K 9/19* (2013.01); *H02K 9/193* (2013.01)

(58) Field of Classification Search  
CPC   H02K 9/19; H02K 9/193; H02K 9/22; H02K 9/16  
USPC .................. 310/52, 53, 58, 59, 61, 54, 60 A  
See application file for complete search history.

(56) References Cited

U.S. PATENT DOCUMENTS

| | | | | |
|---|---|---|---|---|
| 7,156,195 B2* | 1/2007 | Yamagishi | .......... | F16H 57/0476 180/65.1 |
| 7,326,010 B2* | 2/2008 | Geißler | ................. | B23B 31/261 310/52 |
| 8,450,888 B2* | 5/2013 | Shafer | ..................... | H02K 1/20 310/54 |
| 2008/0272661 A1* | 11/2008 | Zhou | ....................... | H02K 9/19 310/61 |
| 2010/0289386 A1* | 11/2010 | Gerstler | ............... | H02K 1/2773 310/60 A |
| 2012/0299404 A1* | 11/2012 | Yamamoto | ........... | H02K 1/2766 310/61 |
| 2015/0042185 A1* | 2/2015 | Buttner | .................... | H02K 1/32 310/54 |
| 2015/0280521 A1* | 10/2015 | Umemoto | .............. | H02K 55/04 310/55 |
| 2015/0280523 A1* | 10/2015 | Tremelling | .............. | H02K 9/19 310/59 |

* cited by examiner

*Primary Examiner* — Thomas Truong  
*Assistant Examiner* — Minki Chang  
(74) *Attorney, Agent, or Firm* — KED & Associates, LLP

(57) ABSTRACT

The coolant supplying and collecting apparatus is inserted along an inner diameter of a rotary shaft of a motor. The apparatus includes a first body section having a hole section formed at one side thereof, and a second body section inserted into and fixed to the first body section. The apparatus is configured to provide a moving path of a fluid along an inner diameter thereof. A channel section is formed between an inner circumferential surface of the first body section and an outer circumferential surface of the second body section and extends in a longitudinal direction to provide a moving path of the fluid in the hole section direction.

6 Claims, 3 Drawing Sheets

COOLANT SUPPLYING AND COLLECTING APPARATUS AND MOTOR INCLUDING THE SAME

CROSS-REFERENCE TO RELATED APPLICATION(S)

This application claims priority to and the benefit of Korean Patent Application No. 10-2012-0147375, filed on Dec. 17, 2012, the disclosure of which is incorporated herein by reference in its entirety.

BACKGROUND

1. Field

The present application relates to a coolant supplying and collecting apparatus and a motor including the same, and more particularly, to a coolant supplying and collecting apparatus used in a motor configured to receive power and generate a high speed rotating force, and a motor including the same.

2. Background

In general, a motor includes a stator on which a coil having a magnetic force is wound, and a rotor functioning as a rotator, and is an instrument configured to use power of a rotary shaft according to rotation of the rotor by a magnetic flux generated by current applied to the coil wound on the stator and electromagnetic induction of the rotor.

The motor needs a cooling unit because a large amount of heat is generated from the stator and the rotor during driving.

A motor cooling method may be generally classified as an air cooling type using a cooling fan or a water cooling type using cooling water. The water cooling type may be provided by a method of inserting and assembling a cooling member between an inner circumferential surface and an outer circumferential surface of a housing using a dual housing structure or a method of inserting and coupling a cooling member along an outer circumferential surface of the stator.

However, the rotary shaft is rapidly rotated while the motor is driven, and thus a large amount of heat is generated. The heat generated as described above may cause deformation of a shape of the rotary shaft, friction of a fixing ring mounted to support the rotary shaft, and demagnetization of a magnet mounted in the motor.

However, while a conventional cooling method may have a certain level of cooling effect of the housing and the stator, it is insufficient to cool the heat generated by the rotary shaft vibrated at a high speed.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
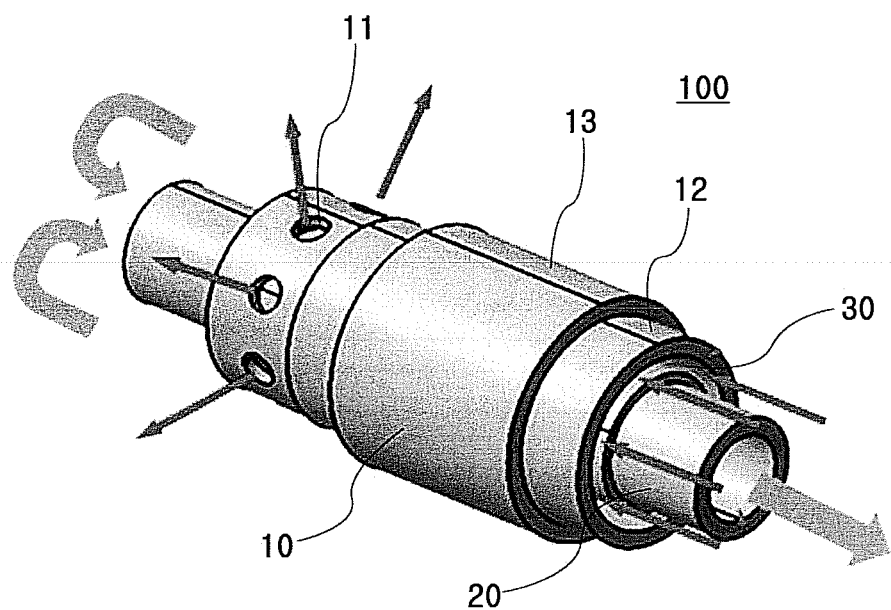
FIG. 1 is a perspective view of a coolant supplying and collecting apparatus according to an embodiment of the present application.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present application. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

In this specification, a singular form includes a plural form unless the context specifically mentions. When an element is referred to using the term "comprises" and/or "comprising," it does not preclude another component, step, operation and/or device, but may further include another component, step, operation and/or device unless the context clearly indicates otherwise. A commercial implementation in accordance with the spirit and teachings of the present application may configured according to the needs of the particular application, whereby any aspect(s), feature(s), function(s), result(s), component(s), approach(es), or step(s) of the teachings related to any described embodiment of the present application may be suitably omitted, included, adapted, mixed and matched, or improved and/or optimized by those skilled in the art, using their average skills and known techniques, to achieve the desired implementation that addresses the needs of the particular application.

Unless otherwise defined, all terms including technical and scientific terms used herein have the same meaning as commonly understood by one of ordinary skill in the art to which this application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an embodiment will be described with reference to the accompanying drawings in detail, the same or corresponding elements are designated by the same reference numerals, and overlapping description thereof will be omitted.

Figure 2:
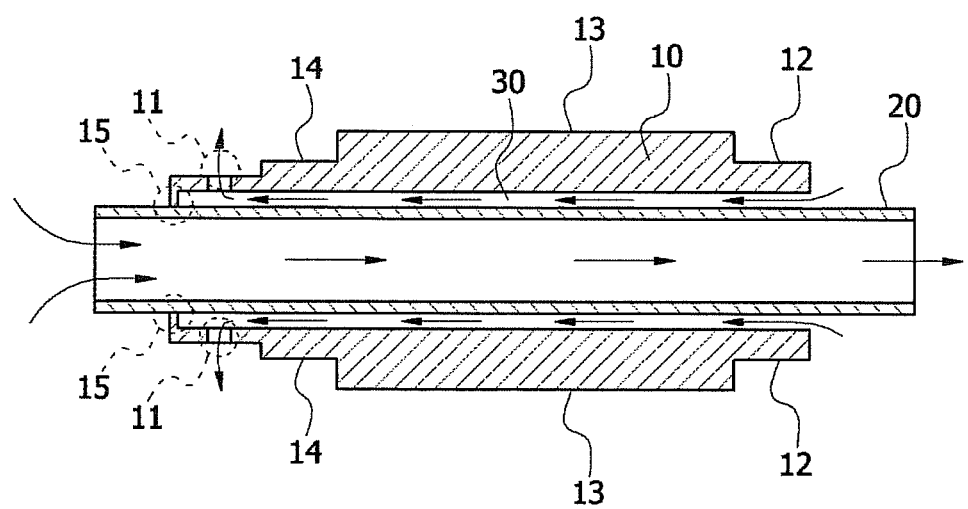
FIG. 2 is a cross-sectional view of the coolant supplying and collecting apparatus according to the embodiment of the present application.

FIG. 1 is a perspective view of a coolant supplying and collecting apparatus according to an embodiment of the present application, and FIG. 2 is a cross-sectional view of the coolant supplying and collecting apparatus according to the embodiment of the present application.

Referring to FIGS. 1 and 2, a coolant supplying and collecting apparatus 100 according to the embodiment of the present application may include a first body section 10, a second body section 20 and a channel section 30.

First, the first body section 10 has a cylindrical hollow shape with one side distal end 15 extending inward in a radial direction to come in direct contact with an outer circumferential surface of the second body section 20 and the other side distal end in which an opening section is formed.

A hole section 11 is formed at one side of the first body section 10, and may be constituted by a plurality of through-holes formed to pass through a sidewall of the first body section 10 in a thickness direction thereof. For example, the plurality of through-holes of the hole section 11 may be linearly formed along a circumference of the first body section 10. However, the through-holes may be arranged in a plurality of rows or an irregular pattern to form the hole section, which may be included in the technical spirit of the present application.

An outer diameter of the hole section 11 of the first body section 10 may be smaller than an outer diameter of a central section 13 of the first body section.

The other side outer diameter of the first body section 10 is smaller than the outer diameter of the central section 13 to form a first step section 12 having a certain step difference from the central section 13. For example, the outer diameter of the first step section 12 may be equal to or slightly smaller than an inner diameter of a bearing (not shown) coupled thereto.

A second step section 14 may be formed between the central section 13 and the hole section 11 of the first body section. An outer diameter of the second step section 14 may be smaller than the outer diameter of the central section 13 of the first body section and larger than the outer diameter of the hole section 11.

For example, the outer diameter of the second step section 14 may be equal to or slightly smaller than the inner diameter of the bearing coupled thereto.

The second body section 20 has a cylindrical hollow shape and may be inserted along an inner diameter of the first body section 10 and fixed thereto, and for example, fixed to the one side distal end 15 of first body section through welding.

The outer diameter of the second body section 20 may be smaller than that of the hole section 11 of the first body section, and the channel section 30 having a predetermined gap that allows movement of a fluid may be formed between the first body section 10 and the second body section 20.

Coolant introduced through the channel section 30 can be supplied to a rotary shaft (not shown) through the through-hole of the hole section 11. Here, the one side distal end 15 of the first body section comes in direct contact with an outer circumferential surface of the second body section 20 to restrict a moving path of the coolant.

The coolant supplied to the rotary shaft through the through-hole is collected to the one side opening section of the second body section 20 to be discharged to the outside through the other side opening section.

As described above, the heat generated from the rotary shaft can be rapidly cooled at high efficiency through an apparatus inserted into the rotary shaft and configured to provide a moving path of the coolant.

Figure 3:
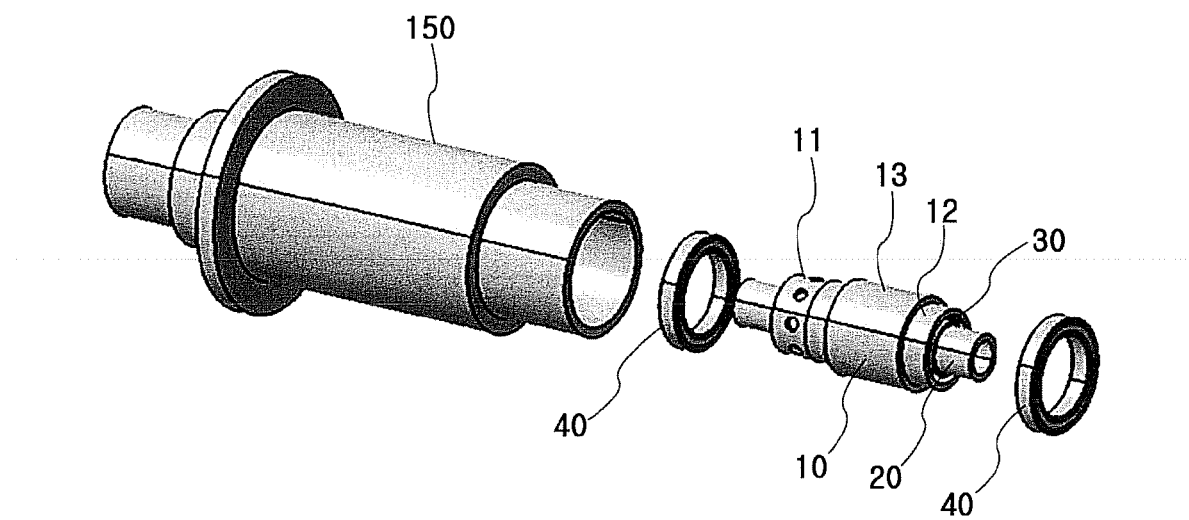
FIG. 3 is an exploded view of the coolant supplying and collecting apparatus and a rotary shaft according to the embodiment of the present application.
Figure 4:
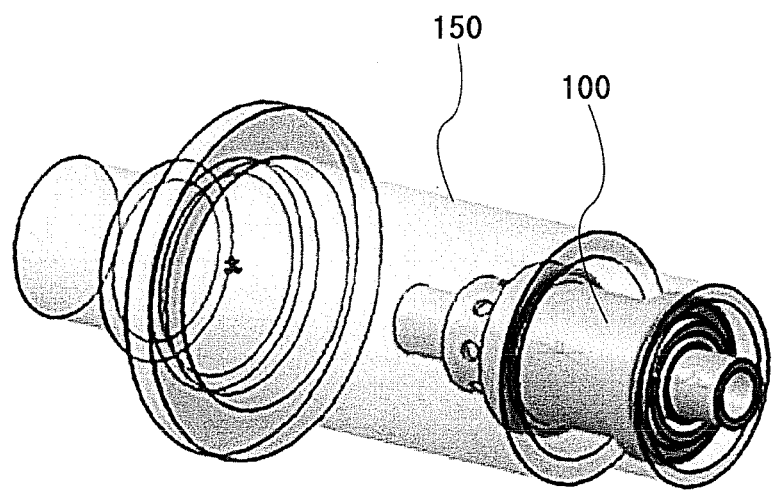
FIG. 4 is an assembled view of the coolant supplying and collecting apparatus and the rotary shaft according to the embodiment of the present application.

FIG. 3 is an exploded view of the coolant supplying and collecting apparatus and the rotary shaft according to the embodiment of the present application, and FIG. 4 is an assembled view of the coolant supplying and collecting apparatus and the rotary shaft according to the embodiment of the present application.

Referring to FIGS. 3 and 4, in the coolant supplying and collecting apparatus 100 according to the embodiment of the present application, bearings 40 are inserted into the first step section 12 and the second step section 14 to be inserted along an inner diameter of a rotary shaft 150 and fixed thereto.

Here, one side of the first body section 10 is first inserted into the rotary shaft 150 so that the coolant introduced through the channel section 30 is supplied into the rotary shaft 150.

Figure 5:
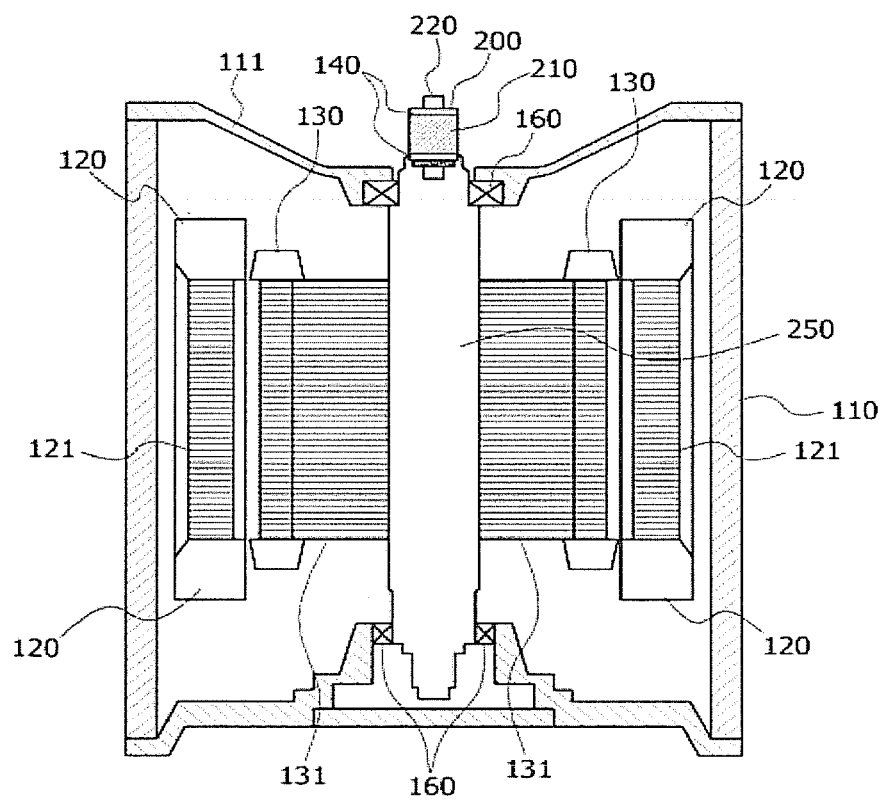
FIG. 5 is a cross-sectional view of a motor according to an embodiment of the present application.

FIG. 5 is a cross-sectional view of a motor according to an embodiment of the present application.

Referring to FIG. 5, the motor according to the embodiment of the present application may include a housing 110, a stator 120 including a stator core and a stator coil 121 wound on the stator core, a rotor 130 disposed to be rotatable with respect to the stator 120, a rotary shaft 250 coupled to an inner circumferential surface of the rotor 130, and a coolant supplying and collecting apparatus 200 inserted along an inner diameter of the rotary shaft 250.

The housing 110 may be formed of a pipe including an accommodating space, having both ends open and a circular cross section with a certain diameter in a longitudinal direction. Both open ends of the housing 110 may be covered by a pair of brackets 111. The brackets 111 are coupled to both ends of the housing 110 to form a cylindrical shape.

However, the housing may have a polygonal cross section, and of course, may be manufactured in various shapes according to shapes of the stator.

The brackets 111 are coupled to both ends of the housing 110 and may have a shape corresponding to a shape of the end of the housing.

Brackets 160 on which the rotary shaft 250 is rotatably supported may be installed at the brackets 111.

The stator 120 may be installed in an internal accommodation space of the housing 110 to generate a magnetic force. The stator 120 is installed adjacent to the inner circumferential surface of the housing 110, and may include a core and a coil 121 wound on the core.

Both ends of the stator 120 are open, and a circular accommodation space in which the rotor 130 is rotatably accommodated may be formed at a center of the stator 120. A plurality of slots and teeth may be formed at an inner diameter section of the stator 120 in a circumferential direction of the space in which the rotor 130 is accommodated.

When current is applied to the stator 120 to generate a magnetic force, a rotator is rotated by electromagnetic induction of the rotor 130. Here, heat is generated from the stator 120 and the rotor 130 due to a high output density.

The rotor 130 may be constituted by a so called induction rotor including a rotor core, a plurality of conductor bars connected to the rotor core, and an end ring connected to come in communication with the conductor bars.

The rotary shaft 250 may be integrally rotatably coupled to a center of the rotor core. While the embodiment of the present application exemplifies an example in which the rotor is constituted by the induction rotor, the rotor may be constituted by a so called permanent magnet rotor including a permanent magnet.

In addition, the rotor may be constituted by a synchronized rotor using a difference in magnetic resistance, and may be constituted by a hybrid rotor including a magnetic resistance wheel and a permanent magnet.

The coolant supplying and collecting apparatus 200 may include a first body section 210 and a second body section 220, and may be coupled along the inner diameter of the rotary shaft 250. The coolant supplying and collecting apparatus 200 can be inserted along the inner diameter of the rotary shaft 250 and fixed thereto with bearings 140 inserted into a first step section and a second step section formed at one side and the other side thereof.

Here, one side of the first body section 210 is first inserted into the rotary shaft such that the coolant introduced through the channel section can be supplied into the rotary shaft 250.

As can be seen from the foregoing, the coolant supplying and collecting apparatus and the motor including the same can efficiently and rapidly cool the heat generated from the rotary shaft, which is rotated at a high speed, while the motor is driven.

The present application is directed to provide a coolant supplying and collecting apparatus capable of efficiently and rapidly cooling heat generated from a rotary shaft rotated at a high speed while the motor is driven, and a motor including the same.

According to an aspect of the present application, there is provided a coolant supplying and collecting apparatus inserted along an inner diameter of a rotary shaft of a motor, the apparatus including: a first body section having a hole section formed at one side thereof; a second body section inserted into and fixed to the first body section and configured to provide a moving path of a fluid along an inner diameter thereof; and a channel section formed between an inner circumferential surface of the first body section and an outer circumferential surface of the second body section and extending in a longitudinal direction to provide a moving path of the fluid in the hole section direction.

The hole section may be constituted by a plurality of through-holes formed to pass through a sidewall of the first body section in a thickness direction.

A circumference of one side distal end of the first body section may extend inward in a radial direction to come in contact with the outer circumferential surface of the second body section.

The apparatus may further include a first step section formed at the other side of the first body section and having an outer diameter smaller than that of the first body section central section.

An outer diameter of the hole section may be smaller than that of a central section of the first body section.

The apparatus may further include a second step section formed between the central section and the hole section of the first body section, and having an outer diameter smaller than that of the central section and larger than that of the hole section.

According to another aspect of the present application, there is provided is a motor including a housing; a stator disposed in the housing and comprising a stator core and a stator coil wound on the stator core; a rotor rotatably disposed with respect to the stator; a rotary shaft coupled to an inner circumferential surface of the rotor; and a coolant supplying and collecting apparatus inserted along an inner diameter of the rotary shaft, and including a first body section having a hole section formed at one side thereof, a second body section inserted into and fixed to the first body section and configured to provide a moving path of a fluid along an inner diameter thereof, and a channel section formed between an inner circumferential surface of the first body section and an outer circumferential surface of the second body section and extending in a longitudinal direction to provide a moving path of the fluid in the hole section direction.

A circumference of one side distal end of the first body section may extend inward in a radial direction to come in contact with the second body section.

The motor may further include a first step section formed at the other side of the first body section and having an outer diameter smaller than that of the first body section central section.

An outer diameter of the hole section may be smaller than that of a central section of the first body section.

The motor may further include a second step section formed between the central section and the hole section of the first body section, and having an outer diameter smaller than that of the central section and larger than that of the hole section.

The coolant supplying and collecting apparatus may be fixed to the rotary shaft through bearings inserted into the first step section and the second step section.

Any reference in this specification to "one embodiment," "an embodiment," "example embodiment," etc., means that a particular feature, structure, or characteristic described in connection with the embodiment is included in at least one embodiment of the application. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A coolant supplying and collecting apparatus inserted along an inner diameter of a rotary shaft of a motor, the apparatus comprising:
    a first body section including a hole section formed at one side thereof;
    a second body section inserted into and fixed to the first body section and configured to provide a moving path of a fluid along an inner diameter thereof;
    a channel section formed between an inner circumferential surface of the first body section and an outer circumferential surface of the second body section and extending in a longitudinal direction to provide a moving path of the fluid in the hole section direction,
    a first step section formed at a first side of the first body section and having an outer diameter smaller than an outer diameter of a central section of the first body section; and
    a second step section formed between the central section and the hole section of the first body section, and having an outer diameter smaller than the outer diameter of the central section and larger than an outer diameter of the hole section;
    wherein an outer diameter of the hole section is smaller than the outer diameter of the central section of the first body section.

2. The coolant supplying and collecting apparatus according to claim 1, wherein the hole section is constituted by a plurality of through-holes formed to pass through a sidewall of the first body section in a thickness direction.

3. The coolant supplying and collecting apparatus according to claim 1, wherein a circumference of a second side of the first body section extends inward in a radial direction to come in contact with the outer circumferential surface of the second body section.

4. A motor comprising:
a housing;
a stator disposed in the housing and comprising a stator core and a stator coil wound on the stator core;
a rotor rotatably disposed with respect to the stator;
a rotary shaft coupled to an inner circumferential surface of the rotor; and
a coolant supplying and collecting apparatus inserted along an inner diameter of the rotary shaft, and comprising a first body section including a hole section formed at one side thereof, a second body section inserted into and fixed to the first body section and configured to provide a moving path of a fluid along an inner diameter thereof, a channel section formed between an inner circumferential surface of the first body section and an outer circumferential surface of the second body section and extending in a longitudinal direction to provide a moving path of the fluid in the hole section direction, a first step section formed at a first side of the body section and having an outer diameter smaller than an outer diameter of a central section of the first body section, and a second step section formed between the central section and the hole section of the first body section, and having an outer diameter smaller than the outer diameter of the central section and larger than an outer diameter of the hole section, wherein an outer diameter of the hole section is smaller than the outer diameter of the central section of the first body section.

5. The motor according to claim 4, wherein a circumference of a second side of the first body section extends inward in a radial direction to come in contact with the second body section.

6. The motor according to claim 4, wherein the coolant supplying and collecting apparatus is fixed to the rotary shaft through bearings inserted into the first step section and the second step section.

* * * * *